United States Patent [19]
Fuchs et al.

[11] Patent Number: 5,649,515
[45] Date of Patent: Jul. 22, 1997

[54] DIESEL FUEL PREHEATER FOR ENGINES

[75] Inventors: Werner Karl-Heinz Fuchs, München; Axel Glet; Dirk Hendrich, both of Köln; Wolfgang Jordan, Grevenbroich, all of Germany

[73] Assignee: Hermann-Frank Müller, Bonn, Germany

[21] Appl. No.: 342,420

[22] Filed: Nov. 18, 1994

(Under 37 CFR 1.47)

Related U.S. Application Data

[63] Continuation of Ser. No. 93,041, Jul. 15, 1993, abandoned, which is a continuation-in-part of Ser. No. 915,932, Jul. 17, 1992, Pat. No. 5,243,953.

[30] Foreign Application Priority Data

| Jul. 18, 1991 | [DE] | Germany | 41 23 866.4 |
| Jul. 15, 1992 | [DE] | Germany | 42 23 030.6 |
| Jul. 14, 1993 | [DE] | Germany | 43 23 583.2 |

[51] Int. Cl.[6] .................................. F02M 31/125
[52] U.S. Cl. ........................................... 123/557
[58] Field of Search .......................... 123/551, 549, 123/552, 547, 545, 546

[56] References Cited

U.S. PATENT DOCUMENTS

| 4,512,323 | 4/1985 | Ruth et al. ............... 123/557 |
| 4,748,960 | 6/1988 | Wolf ......................... 123/557 |
| 4,754,741 | 7/1988 | Houtman ................... 123/557 |
| 4,811,719 | 3/1989 | Baumann .................. 123/557 |
| 5,036,825 | 8/1991 | Stone ........................ 123/557 |

*Primary Examiner*—Marguerite McMahon
*Attorney, Agent, or Firm*—Robert W. Becker & Associates

[57] ABSTRACT

Diesel fuel preheaters with a heat exchanger and electric heating serve, for example, at low temperatures to maintain the flowability of diesel fuel and furthermore to quickly heat diesel fuel to achieve defined conditions for a fuel conserving and emission reduced combustion of the fuel and a better engine performance. The diesel fuel preheaters are provided with an integrated control unit and are adaptable to various engines and operational conditions. A special electric heating element in cooperation with the integrated control unit and the heat exchanger provide a fast and economic preheating of the diesel fuel. Furthermore, various advantageous couplings and mechanisms for the regulation of the heat transfer from the heat-delivering medium such as cooling water to the diesel fuel at the heat exchanger are shown and described.

17 Claims, 11 Drawing Sheets

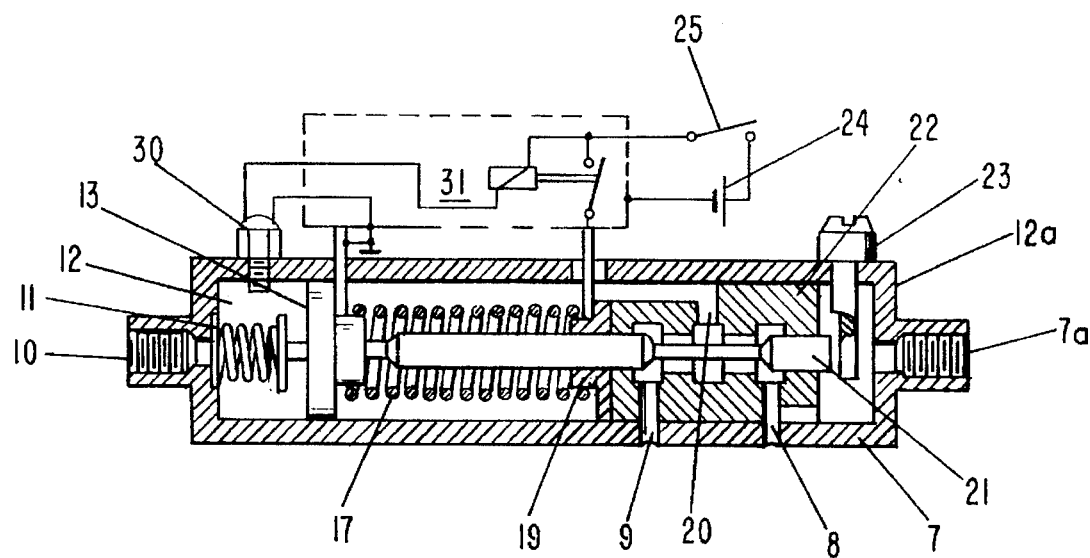
FIG-2
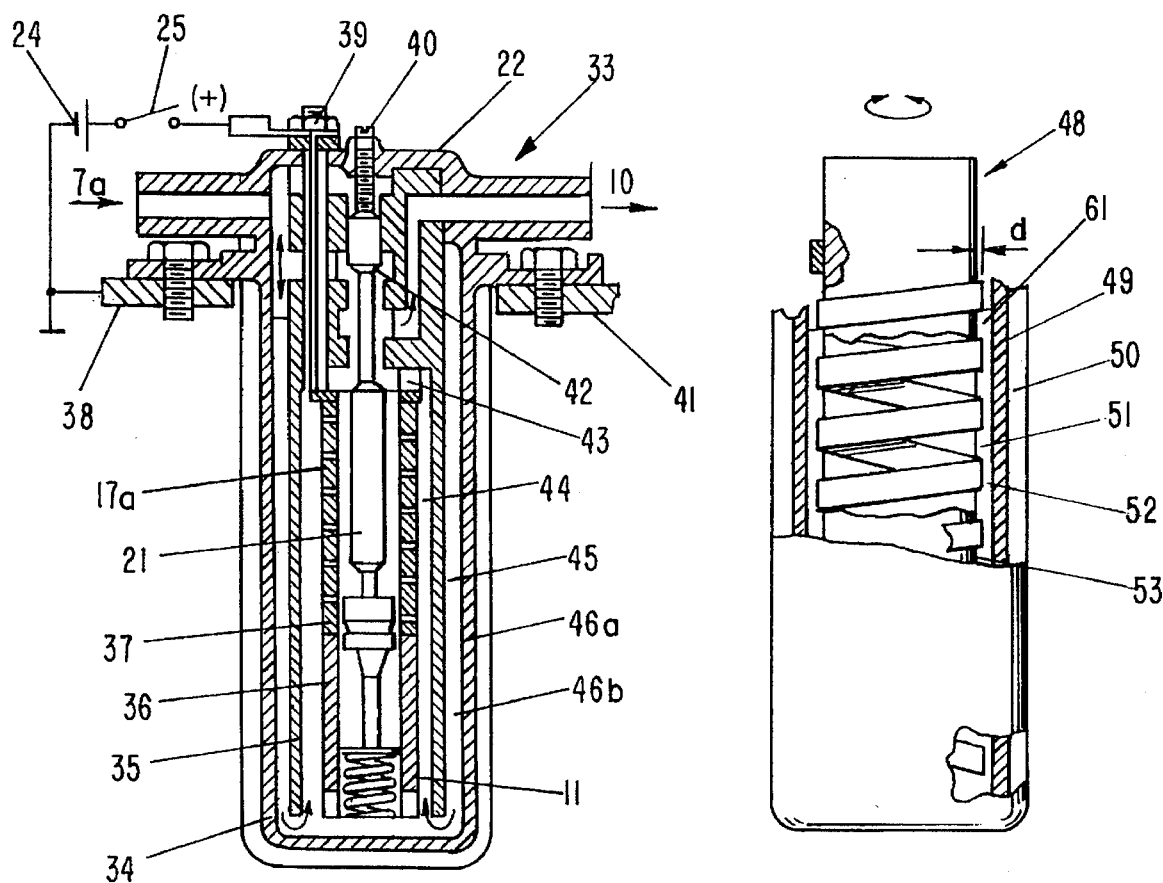
FIG-3
FIG-4

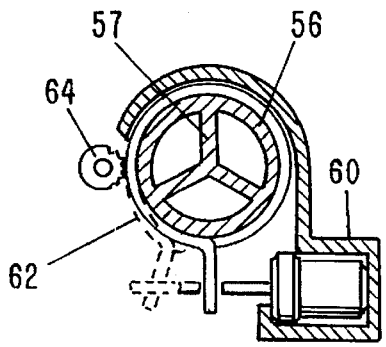
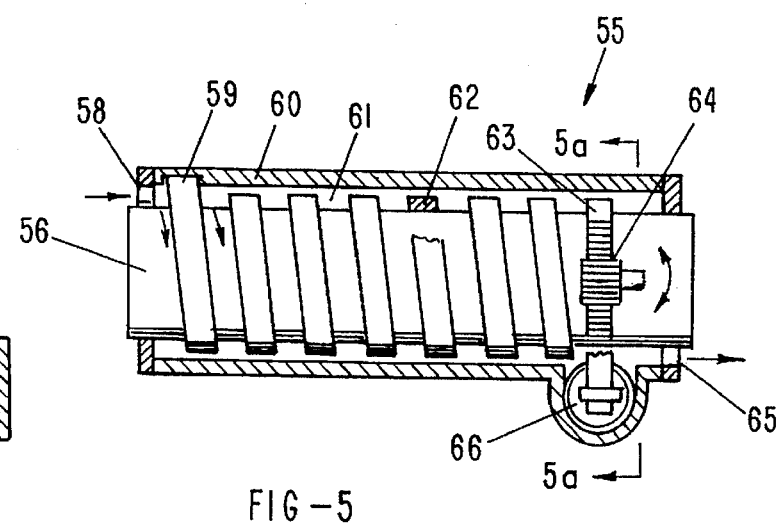
FIG-5a  FIG-5
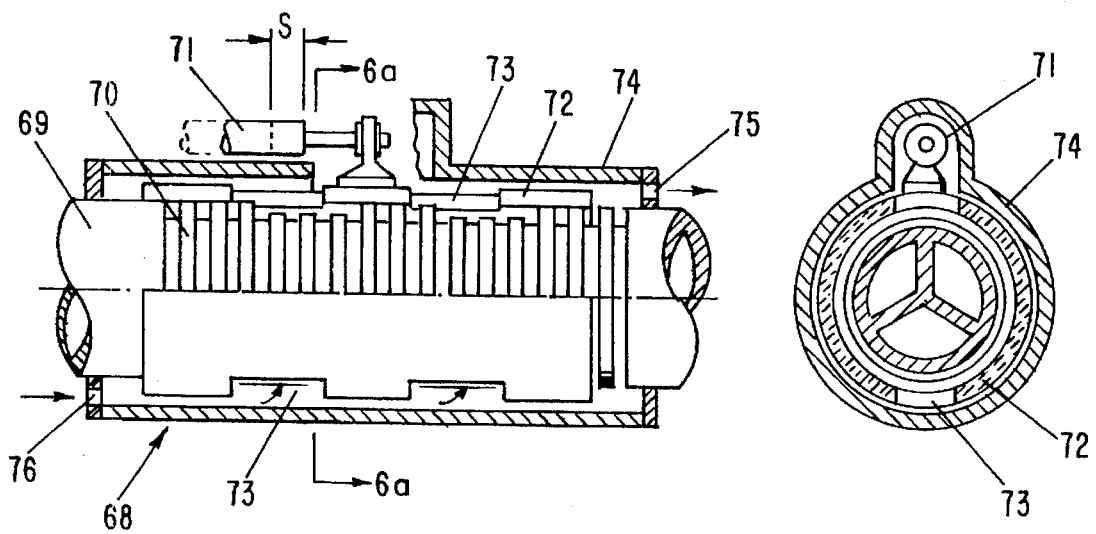
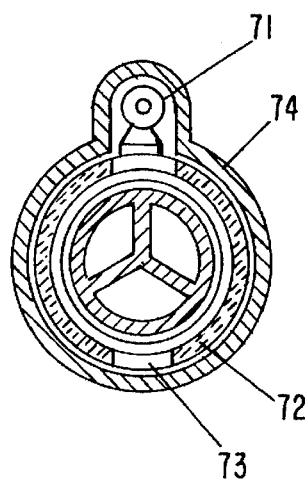
FIG-6  FIG-6a
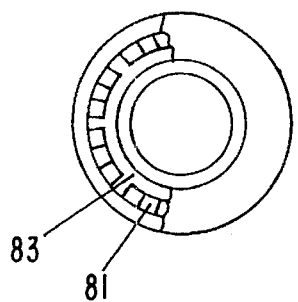
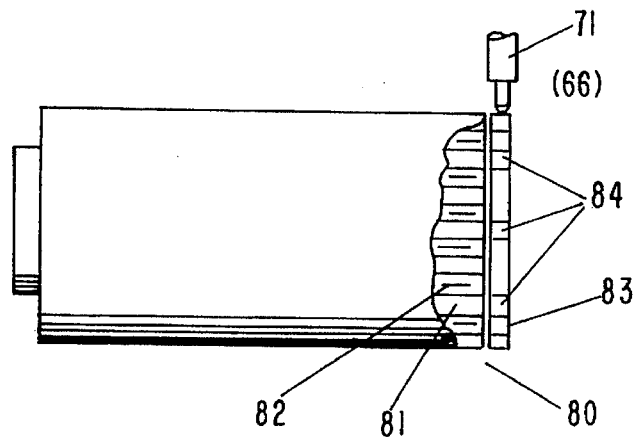
FIG-7a  FIG-7

SECTION A-A

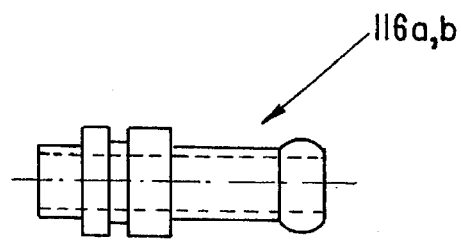
FIG-12a
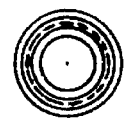
FIG-12b
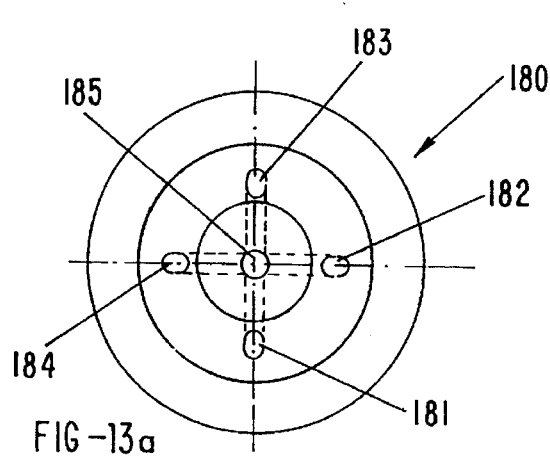
FIG-13a
FIG-13b
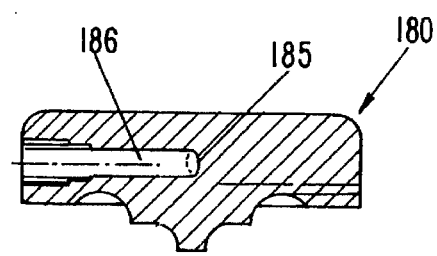
FIG-13d
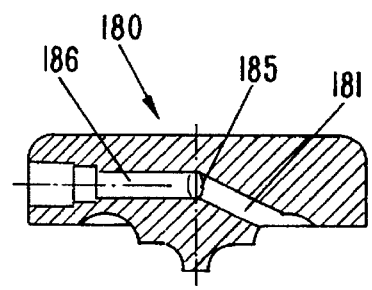
FIG-13e
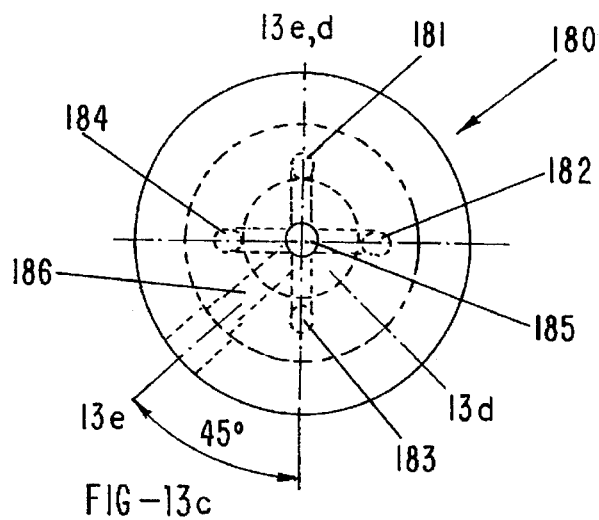
FIG-13c 5,649,515

DIESEL FUEL PREHEATER FOR ENGINES

This application is a continuation of application Ser. No. 08/093,041, filed Jul. 15, 1993, now abandoned, which is a continuation-in-part application of application Ser. No. 07/915,932, filed Jul. 17, 1992, now U.S. Pat. No. 5,243,953.

BACKGROUND OF THE INVENTION

The present invention relates to a diesel fuel preheater for engines, especially motor vehicle engines, in which the diesel fuel is heated electrically and by a heat exchanger.

Electrically heated diesel fuel preheaters as well as preheaters for engines in which the cooling water, the motor oil, the exhaust gases, the engine block itself and similar heat sources are used to preheat the diesel fuel are known.

However, it is disadvantageous that electric diesel fuel preheating requires a relatively great and long lasting current consumption with a respective load on the battery and the electric on-board system. When heat exchangers are used, it is disadvantageous that the heating effect is usually very slow. This might be compensated for by oversizing the respective heat exchanger, however, this results in return in an overheating of the diesel fuel which may lead to the formation of vapor bubbles within the fuel.

Originally, the primary function of such diesel fuel preheaters has been to prevent the partial solidification of the diesel fuel at low temperatures in order to improve the flow characteristics especially through the fuel filter to thereby prevent cold start and running problems of the engine. Nowadays, a diesel fuel preheater should also fulfill other requirements with respect to environmental issues by reducing the cold running characteristics, improving the engine performance and reducing the fuel consumption as well as the emission values.

In view of these requirements a fast and steeply inclined fuel heating to a certain temperature of approximately 50° to 60° C. is desirable and the temperature should be maintained at this level in order to quickly provide favorable defined conditions for the engine performance. Known diesel fuel preheaters do not fulfill the above mentioned requirements or they have the disadvantage of being of a complicated design and expensive, requiring a lot of space and providing low adaptability. A good adaptability is desirable in order to provide a universal application of only a few sizes of diesel fuel preheaters for various engines.

It is therefore an object of the present invention to provide fast and favorable fuel heating in a simple, economic, and reliable manner with a space and cost conserving preheater and to prevent thereby the known disadvantages.

BRIEF DESCRIPTION OF THE DRAWINGS

This object, and other objects and advantages of the present invention, will appear more clearly from the following specification in conjunction with the accompanying drawings, in which:

FIG. 2 shows a cross-sectional view of a further electrical heating and control device for a diesel fuel preheater according to FIG. 1;

FIG. 3 is a cross-sectional view of an inventive diesel fuel preheater having a heat exchanger which is immersed into a heat-delivering medium and further having an electric heating and control device;

FIG. 4 shows a diesel fuel preheater with an immersed, controllable heat exchanger;

FIG. 5 shows a diesel fuel preheater which is adjustable and controllable with respect to varying the heat transfer;

FIG. 5a shows a partial cross-sectional view along the line A–B of FIG. 5;

FIG. 6 shows a controllable diesel fuel preheater having a sliding sleeve;

FIG. 6a is a part-sectional view along the line C–D of FIG. 6;

FIG. 7 shows a controllable diesel fuel preheater having a rotary slide valve; and FIG. 7a is a part-sectional view from the right of FIG. 7;

FIGS. 12a–b show a preferred embodiment for the inlet and outlet sockets, FIG. 12a illustrating a side view and FIG. 12b showing an end view;

FIGS. 13a–e show the cover for a PTC element operated device, FIG. 13a representing a bottom view, FIG. 13b showing an end view, FIG. 13c showing a top view, FIG. 13d illustrating an axial section along line A–B in FIG. 13c, and FIG. 13e showing a section along line A–C in FIG. 13c;

SUMMARY OF THE INVENTION

Figure 1:
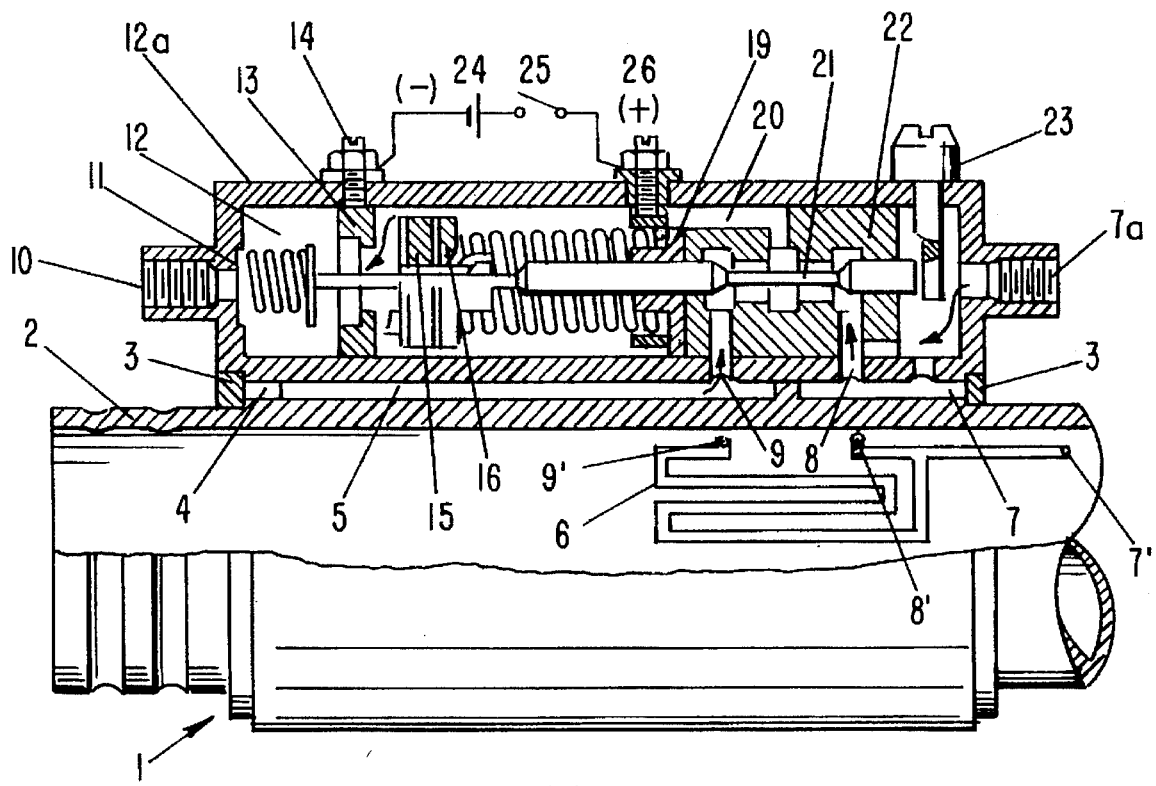
FIG. 1 shows a diesel fuel preheater of the present invention with a heat exchanger and, in a part-sectional view, an electrical heating and control device.

The diesel fuel preheater for engines of the present invention is primarily characterized by an electric heating chamber positioned downstream of the heat exchanger; a 3/2 way valve connected to the electric heating chamber and the heat exchanger, whereby the 3/2 way valve, in an activated state, guides a flow of diesel fuel through the heat exchanger and the heating chamber, and, in a deactivated state, guides a portion of the flow of diesel fuel through the heat exchanger, and the 3/2 way valve further comprising an adjustment means for regulating the flow of diesel fuel; an electric heating means fastened within the heating chamber; and a switching unit connected to the heating means. The adjustment means may be in the form of a displaceable piston, partially comprised of a ferromagnetic material, and positioned in a slidable manner within the heating means and the 3/2 way valve. Preferably, a device for adjusting a rest position of the piston is also provided. A thermostat may be provided within the heating chamber and may act on the piston. The heating means provided may be in the form of a heating coil. According to the characterizing features of the present invention simple and inexpensive components are provided which, within a tight space, provide a plurality of functions. For example, the diesel fuel heating means may simultaneously function as an electromagnet and the valve, respectively, its piston as the magnet anchor.

In a preferred embodiment the heating means further comprises a PTC (positive temperature coefficient) heating element fastened within the heating chamber which is positioned adjacent to an outlet of the heating chamber and directly adjacent to the heating coil, whereby the PTC heating element is in a serial connection with the heating coils.

The heating means is preferably comprised of a material having a positive temperature coefficient.

Furthermore, a PTC measuring element may be provided which is positioned at an outlet of the heating chamber and connected to the switching unit. With this embodiment components are provided which fulfill a plurality of tasks so that thereby a substantial cost reduction is possible. In order to achieve a simple and favorable adaptability of the inventive diesel fuel preheaters to various engines or to various climatic conditions and to provide further advantages such as cost reduction due to decreasing of the number of types of preheaters needed thereby achieving lower storage costs, further advantageous embodiments of the present invention are set forth in the following paragraphs.

The heating means may be in the form of an exchangeable heating cartridge that is positioned within the heating chamber.

In another embodiment the heat exchanger may be comprised of a tube having a heat-delivering medium flowing through its interior and diesel fuel streaming past its exterior mantle surface which functions as the a heat exchanging surface. The tubes have an annular disk at ends thereof and the exterior mantle surface is provided with ribs extending in an axial direction between the annular disk such that a first end is connected to the sealing disk and a second end is spaced at a distance from the annular disk. Adjacent ones of the rib thus alternatingly provide a space at a respective one of the annular disk, thereby forming a meandering channel system. A transverse stay is positioned between two adjacent ribs to close the channel system. Bores are provided on either side of the transverse stay for connecting the 3/2 way valve to the channel system.

In another embodiment the heat exchanger may be comprised of a cup-shaped housing which is immersed in a heat-delivering medium, whereby the housing has inner and outer ribs. The heating means is in the form of an exchangeable heating cartridge that is coaxially surrounded by a tube that is open at one end. The heating cartridge together with the tube delimits the heating chamber. They are inserted in the interior of the housing. The tube together with the inner ribs forms channels and the heating chamber is connected with one end, that is formed by the open end of the tube, connected to the channels and with the other end to the 3/2 way valve.

In a further embodiment of the present invention the heat exchanger comprises a tube with radial outer ribs, whereby the tube with an outer mantle surface is in contact with the diesel fuel and with an inner mantle surface thereof is in contact with a heat-delivering medium. The individual ribs have varying outer diameters and are arranged over a length of the tube in groups of their respective outer diameters. The tube is provided with a sliding sleeve having a plurality of radial cutouts that are arranged in pairs opposite one another over a length of the sliding sleeve. The radial cutouts provide openings to expose the ribs. The sliding sleeve is connected to the adjustment means which is, for example, in the form of a displaceable piston.

In another alternative the heat exchanger comprises a tube with axial ribs whereby the tube with an outer mantle surface thereof is in contact with the diesel fuel and with an inner mantle surface thereof with a heat-delivering medium. The ribs form axial channels and a rotary slide valve is positioned at least one end of the axial channel and connects to the adjustment means. The rotary slide valve controls the flow of diesel fuel through the axial channels by opening and closing at least one of the axial channels.

Furthermore, it is expedient that the heat exchanger comprises an inner and an outer tube arranged concentrically to one another so that they provide therebetween an annular space for the diesel fuel. The interior of the inner tube provides space for a heat-delivering medium. A coil of a band-shaped heat-conducting tensile material is arranged within the annular space and contacts the surfaces of the inner and outer tubes to form a channel for the diesel fuel. The coil is removable from at least one of the surfaces of the inner and outer tubes for adjusting a heat transfer to the diesel fuel. The coil is preferably at least partially formed of a gauze-like material. It is expedient to fasten the coil with one end thereof to the inner tube and with the other end to the outer tube whereby the inner and outer tubes are adjustable relative to one another for adjusting the heat transfer to the diesel fuel. Preferably, the adjustment means is a strain gauge thermostat that is connected to the coil.

The advantages of the inventive diesel fuel preheater, on the one hand, lie in its favorable function by which the diesel fuel is quickly and economically heated and, on the other hand, in its simple and compact design which allows for material and rate reduction and results in an inexpensive manufacture. The electric diesel fuel heating means functions only as an auxiliary means and is switched on automatically only when and as long as low temperatures, for example, during a cold start, require its assistance. Under any other circumstances the diesel fuel heating is achieved solely by the heat exchanger which for this purpose uses the heat-provided by the cooling water. An unnecessary electric heating of the diesel fuel is thus automatically prevented since the increasing engine, respectively, cooling water temperature, immediately contributes to the diesel fuel heating so that in the beginning the electric heating is supported, but then automatically switched off when the heat exchanger alone may reach the desired diesel fuel temperature. With the fast temperature increase which may be achieved by the inventive diesel fuel preheater, the ignition characteristics of the diesel fuel are quickly improved which, especially during cold start and cold running conditions, is very advantageous. With an improved combustion and a reduction of the period of cold running the diesel fuel consumption and the exhaust emission values are reduced. An effective and fast diesel fuel preheater may further contribute to the reduction of friction, wear and engine noises during the cold running period. For an engine operating at its usual operating temperature the preheated diesel fuel with a correspondingly uniform density provides defined conditions for an optimum injection, combustion and energy transfer.

According to another embodiment of the present invention, the 3/2 way valve of the inventive diesel fuel preheater has a first throughbore connected to the heat exchanger and a second throughbore connected to a bypass line for bypassing heat exchanger and heating chamber. The 3/2 way valve, in its deactivated state thereof, guides a portion of the flow of diesel fuel through the bypass line. The preheater further comprises a housing having a first housing section, a second housing section, and a third housing section, wherein the first housing section encloses the 3/2-way valve, the second housing section encloses the heating chamber, and the third housing section encloses a chamber for the adjusting member. The 3/2-way valve includes a control slide axially slidable within the first housing section. The control slide has a fuel inlet connected to the first and the second throughbores. The adjusting means is an expansion member for displacing the control slide to open and close the first and second throughbores as a function of a temperature of the fuel at the outlet socket of the diesel fuel preheater. The heating means preferably comprises a heating coil. The switching unit comprises a thermostat and supplies current to the heating coil as a function of a temperature of the fuel within the heating chamber.

Preferably, the diesel fuel preheater further comprises a push rod connected between expansion element and control slide. Advantageously, the diesel fuel preheater also includes a connecting line between the heating chamber and the chamber for the adjusting member.

Expediently, a first pressure spring is positioned within the chamber for the adjusting member for connecting the expansion element within the third housing section. A second pressure spring is positioned within the first housing section and connected to the control slide of said 3/2-way valve for biasing the 3/2-way valve into the activated state.

In another preferred embodiment of the present invention, the diesel fuel preheater has an end position of the deactivated state in which the 3/2-way valve shuts off flow of the portion of diesel fuel through the heat exchanger such that diesel fuel flows exclusively through the heating chamber. Preferably, the 3/2-way valve is a rotatable control piston and the adjustment means is a bimetallic spring connected to the control piston. The bimetallic spring rotates the control piston as a function of the temperature of the diesel fuel. Expediently, the control piston comprises a cylindrical wall and a bottom with an arc-shaped groove for limiting an angle of rotation of the control member. The cylindrical wall has two throughbores arranged asymmetrically within the cylindrical wall.

Preferably, the diesel fuel preheater has a housing for receiving the control piston and enclosing the heating chamber. The housing has two bores cooperating with the throughbores of the cylindrical wall such that a sum of flow cross-sections of the two throughbores in a partially open state corresponds to a cross-section of a completely open throughbore.

The preheater further includes a shaft connecting the bimetallic spring with the control piston, wherein a position of the control piston relative to the bimetallic spring is adjustable by rotating the shaft.

Advantageously, the diesel fuel preheater further comprises a cover and a support for the housing and an enclosure made of sheet metal for centering the housing, the cover, and the support relative to one another by slipping the enclosure over the cover, the housing, and the support. The bottom portion of the enclosure, after positioning and centering, is stamped for a permanent fast connection of enclosure, cover, housing, and support.

Expediently, the heating means is a heating coil wound from a wire that has a temperature-independent resistance. The heat exchanger comprises a heat exchanger coil made of copper pipe that is connected to the housing and positioned on the support.

Preferably, the switching unit is a temperature switch with a two stage control.

The diesel fuel preheater expediently further comprises an overload protector in the form of a temperature fuse connected in series with the heating coil. The temperature fuse is connected within the cover directly adjacent and parallel to the heating coil.

The cover preferably has four slanted bores extending substantially radially, when viewed in a plan view, and a central axial bore. The radially extending bores connect the heating chamber to the axial bore. The cover further comprises an outlet channel connected to the central axial bore.

Further details and advantages of the present invention may be taken from the following description of the preferred embodiments.

DESCRIPTION OF PREFERRED EMBODIMENTS

The present invention will now be described in detail with the aid of several specific embodiments utilizing FIGS. 1 through 7.

FIG. 1 shows a view of an inventive diesel fuel preheater 1 which is shown in a part-sectional representation and which may have, for example, a pear-shaped cross-section similar to the housing 74 shown in FIG. 6a. A tube 2, preferably made from aluminum, is, for example, inserted into the cooling water circuit of a diesel engine. The tube 2 carries the cooling water and serves as a heat exchanger 6. At its outer circumference it is provided with a channel system 4 for the diesel fuel to be heated. The tube 2 may also be provided at its inner circumference with further ribs for an improved heat transfer (not represented in the drawing). The tube 2 may be inserted into the cooling water circuit by, for example, slipping the hose end of the cooling water hoses onto the ends of the tubes and fastening the ends with clamps. It is also possible to provide the ends of the tube 2 with flanges that have respective sockets for the connection to the hose end. Furthermore it is possible that the sockets are embodied as so-called hose quick couplings which are known from DE-OS 37 29 570. It is also possible to provide one end of the tube 2 of the heat exchanger 6 with a flange which is connected to the engine block and to connect the cooling water hose to the other free tube end. The channel system 4 provided at the circumference of the tube 2 may be formed in any desirable manner and, for example, may be formed by ribs 5. The channel system 4 is limited on both ends of the tube by annular disks 3 and is, for example, sealed by respective sealing rings. The channel system 4 in FIG. 1 is represented in a schematic and scale-reduced manner (to facilitate the understanding of the drawings) in the form of a meandering tube 6 with an inlet bore 7' and outlet bores 8' and 9'. Above, corresponding connecting bores 7, 8, and 9 of the corresponding 3/2 way valve 22 are shown. The channel system 4 is represented in more detail in FIG. 1a. The 3/2 way valve 22 which functions as a switching valve is positioned within the housing 12a of the heating chamber 12. The connecting bore 7 is connected to the fuel line which supplies fuel from the tank via a fuel pump. The oppositely arranged outlet 10 is connected to a fuel line which guides the fuel via a filter to the injection pump. Adjacent to the 3/2 way valve 22 within the housing 12a of the heating chamber 12 an electric heating coil 17 is arranged which, for example, may be made from a single layer of windings of a relatively thick resistance wire. The tube-shaped heating coil 17 is connected to a PTC heating element 15 arranged in the vicinity of the outlet 10 of the heating chamber 12 via an electrically and electromagnetically conductive socket 16 that is, for example, comprised of a ferromagnetic material such as iron. The PTC heating element 15 and the heating coil 17 are connected in series. The PTC heating element 15 is contacted at a face thereof, for example, by metal disks and on the left hand side of the drawing by a metal socket 13 and a contact screw 14 connected to the housing 12a respectively to the minus or ground leads of the vehicle battery 24. The right end of the heating coil 17 is electrically insulated by a bushing 19 and is connected via a conductive annular contact 18 to the plus pole 26 of the battery 24 which is insulated relative to the housing. The PTC heating element 15 is expediently provided with a relatively small electric resistance, i.e., it is suitable for a small electric voltage and great electric current intensity. Accordingly, the electric heating capacity for the electric diesel fuel preheating is provided mostly by the heating coil 17 and to a lesser extent by the PTC element 15. Due to the relatively small electric power generated within the PTC element 15 it may be manufactured in a more compact form and at lower costs compared to a heating element which must provide the entire electric power. The PTC element 15 and the heating coil 17 are provided and constructed such that an intensive contact with diesel fuel is provided whereby the diesel fuel streams along all sides of the PTC element 15 and the heating coil 17.

It is preferable that the heating coil 17 is comprised of a material, respectively, an alloy, which has a positive temperature coefficient and which may be provided as a lead on a ceramic sleeve. Due to such an embodiment a self adjusting means is integrated into the heating coil 17a and a separate PTC element 15 is obsolete. The electric heating chamber 12 is connected via the shown channels to the center branch 20 of the 3/2 way valve 22 and via the socket 13 to the outlet 10 of the housing 12a of the heating chamber 12. A piston 21 which is at least partially comprised of a ferromagnetic material, for example, iron, is axially slidably supported within the heating coil 17 and the 3/2 way valve 22. Its right end contacts a set screw 23 which presses the piston 21 onto a spring 11. With the aid of this set screw 23 the rest position of the piston 21 may be finely and coarsely adjusted, respectively, selected. The flattening of the set screw 23 on one side as shown in drawing 1, provides for two selectable rest positions of the piston 21, for example, for summer and winter operation of the engine. Instead of the screw 23 other setting devices could be provided for the same task, such as a pressure button together with a locking element.

In another embodiment a bimetallic or strain gauge thermostat may be positioned with the heating chamber 12 in order to replace the spring 11 whereby the thermostat is connected to the piston 21 and acts on it in order to displace the piston with increasing temperature to the right in a continuous or discontinuous manner. Both adjustment movements are possible by providing plate-spring-like bimetallic disks which may be provided with a snap effect.

As can be seen in FIG. 1, all of the components 11 to 22 are combined in the form of a cartridge within the housing 12a and positioned on the diesel fuel preheater 1. The effect of the PTC heating element 15 with its simple automatic temperature respectively heating current limitation is maintained despite the relatively compact design whereby at the same time the magnetic field of the heating coil 17 is used for controlling functions. The advantageous embodiment and use of individual components for multiple functions provides for an uncomplicated inexpensive design with an increased reliability. The compact and slim design also reduces space requirements and the cartridge form provides for a simple replacement of important components. Especially, it is possible to produce such cartridges with different heating power which may be positioned within the same housing of the diesel fuel preheater 1. Resulting advantages are, for example, the universal applicability of the diesel fuel preheater and, at the same time, reduced storage costs.

Figure 1A:
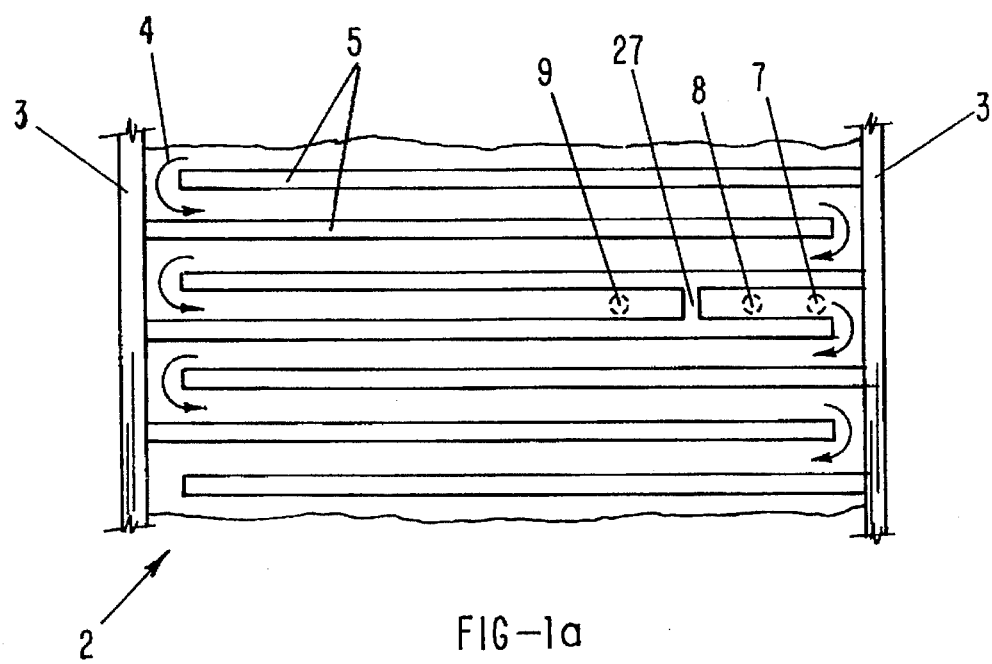
FIG. 1a is a developed representation of the meander-like channel system of the heat exchanger according to FIG. 1 which is shown in a shortened representation relative to the circumferential direction.

FIG. 1a shows a plan view of a developed section of the channel system 4 of the tube 2. The ribs 5 of the tube 2 are alternatingly positioned to the right and the left so that they alternatingly contact the faces of the annular rings or disks 3. Thus, a meander-like channel system 4 results. This channel system 4 is interrupted in the vicinity of the 3/2 way valve 22 by a transverse rib 27. The left channel next to the transverse rib 27 is connected to the connecting bore 9 of the 3/2 way valve 22 and the right channel opens into the connecting bores 7 and 8 as can be seen in FIG. 1. In this embodiment the tube 2 may be produced in a simple and inexpensive manner, for example, by injection molding.

In the following the function of the diesel fuel preheater 1 during a cold start operation will be explained. The electric heating coil 17 with its contacts 14 and 26 is connected via a symbolically represented switch 25 to the vehicle battery 24. Expediently, the switch 25 respectively the heating coil 17 is switched on simultaneously with the heater plugs of the diesel engine, for example, by being connected to the switch for the heater plugs or a control unit for the heater plugs. The switch 25 remains in its closed position after the start of the diesel engine for a limited time or as long as the engine is running. The heating coil 17 which is supplied with a strong electrical heating current pulls the piston 21 to the left. Accordingly, the diesel fuel line from the connecting bore 8 to the channel 20 is closed and, at the same time, another fuel line is opened via the connecting bore 9 to the channel 20 in the direction towards the electrical heating chamber 12. The fuel flows accordingly from the inlet 7a via the connecting bore 7 through the entire channel system 4 of the heat exchanger 6 before it enters the downstream electrical heating chamber 12 and the outlet 10 via the connecting bore 9/channel 20. The started engine supports the electrical heating because due to the increasing cooling water temperature preheated fuel enters the electrical heating chamber 12. The fuel temperature increases accordingly at a fast rate and the electrical heating period is therefore shortened. When the fuel temperature has reached the desired value the PTC heating element 15 provided in the vicinity of the outlet of the heating chamber 12 switches off the electrical heating current so that the spring 11 pushes the piston 21 to the right into its rest position represented in the drawing. The piston 21 remains in this position in which the heat exchanger capacity is reduced due to the partial stream created by the slightly open valve path through connecting bore 9/channel 20 when the engine has reached its operating temperature. The fuel temperature at the outlet 10 is adjusted via the screw 23 such that the PTC element 15 keeps the electric heating switched off. When low temperatures are present, as for example in the winter season, the piston 21 may be adjusted to the left via the set screw 23 so that the portion of the diesel fuel which streams through the entire heat exchanger and from there via connecting bore 9 into the heating chamber 12 is increased and the partial stream at a lower temperature which flows through the connecting bore 8 is accordingly reduced. In order to perform the desired fuel preheating in a fast and current-conserving manner the heat exchanger with its channel system 4 is preferably oversized. Due to the switching of the flow paths of the diesel fuel in the aforementioned manner via connecting bore 8 or 9 an overheating of the diesel fuel is prevented without having to provide a thermostat.

FIG. 2 shows a different embodiment of the cartridge enclosed in housing 12a according to FIG. 1. In this embodiment a PTC measuring element 30 is fastened to the housing 12a in the vicinity of the outlet 10 for controlling the temperature of the preheated diesel fuel. The PTC measuring element 30 is electrically connected to a switching device 31 to which the heating coil 17 and the battery 24 of the vehicle together with the switch 25 are also connected. One end of the heating coil 17 is, for example, electrically connected to the housing 12a and the ground respectively minus lead of the battery 24 while the other end is connected to the housing of the switching device 31 in an insulated manner. The switching device 31 may be comprised of a semiconductor or, in the simplest manner, may be a relay. The excitation windings of the relay are connected in series with the PTC measuring element 30 and its switching contact, as can be seen in the drawing, is connected to the heating coil 17. The relay is automatically activated when the switch 25 is closed and remains closed as long as the fuel has not reached the desired temperature at the outlet 10. The construction and the function of the other components is similar to the embodiment described in FIG. 1.

In FIG. 3 a diesel fuel preheater 33 is represented which is immersed into the heat-delivering medium which may be a liquid or a gas. This diesel fuel preheater 33 is, for example, flanged to a bore at the engine block 41 so that the cooling water streams passed it. It is however also possible that the diesel fuel preheater is exposed to the motor oil, hot air or the exhaust gases. At least partially it is also directly heated from the engine block 41 via the flange. The tube-shaped or cup-shaped housing 34 which is, for example, comprised of cast aluminum and which serves as the heat exchanger, is provided at its outer and inner circumference with axially oriented ribs 46a and 46b. In the center of the housing 34 a tube-shaped electric heating cartridge 17a is provided which has integrated therein a PTC element in the form of a coil-shaped lead which has a positive temperature coefficient. The heating cartridge 17a is surrounded by a tube 35 which is open at its lower end and which contacts the inner ribs 46b of the housing 34 so that between the ribs axially extending channels 45 for the diesel fuel to be preheated are formed. The lower end of the heating cartridge 17a is fixedly connected to the housing 34 via an electrically conducting bushing 36, which is provided with a bearing 37 for the piston 28, so that the heating cartridge 17a is connected to the ground contact 38. At its upper end the heating cartridge 17a is connected to an electrically insulating contact 39. The spring 11 which is disposed within the bushing 36 pushes the piston 21 into its resting position which is selectable via a set screw 40 at the 3/2 way valve 22.

The function of the above described cartridge will be explained in the following paragraph. In a cold start situation or when the fuel temperature is too low, the PTC heating cartridge 17a is switched on which in return pulls the piston 21 in a downward direction. The upper flow path via 42-10 is thus closed and the lower previously partially open flow path 43-10 is open entirely. Accordingly the entire flow of diesel fuel flows from the inlet 7a through the heat exchanger channels 45. Then it flows in the direction of the arrow in an upward direction through the electric heating chamber 44 and the lower valve opening 43 towards the outlet 10. As soon as the heat exchanger provides the desired fuel temperature by itself the electric heating is automatically shut off and the piston 21 is reset via the spring 11 into its rest position at the set screw 40. The piston 21 remains in this position during the operation of the engine so that only a partial flow of diesel fuel flows through the heat exchanger. The effect of heat exchanger which is oversized in order to provide a faster heating action is thus reduced from its previous maximum efficiency to its normal efficiency in which no overheating of the diesel fuel at the outlet 10 occurs.

The diesel fuel preheater 48 according to FIG. 4 has an immersible heat exchanger in which the heat transfer may be controlled in a continuously adjustable manner. The cup-shaped housing 49 of the heat exchanger which may be comprised of cast aluminum is provided at its outer circumference with ribs 50 and at its inner circumference with a smooth cylinder bore 51. A coil 52 made from a heat conducting material such as aluminum band is wound such that it contacts the walls of the cylinder bore 51 with a prestress. One end of the coil 52, for example, the lower end, is fixedly connected to the housing 49 so that no rotation may occur. Within the coil 52 a tube 53 is provided or, in another embodiment, the tube 35 of the heating cartridge spaced at a relatively small distance D from the coil. The upper end of the coil 52 is fixedly connected to the tube 53 so that no rotation can take place. Advantageously, the coil 52 may be fastened to the tube and the housing by a tongue-groove means in a rotation-fast manner (not shown in the drawing). The coil 52 may be made of a flexible heat conducting gauze band, for example, a metal band.

In the following paragraph the function of the aforementioned cartridge will be explained. The diesel fuel to be heated flows into the cylinder bore 51 which surrounds the tube 53 (or 35) and through the channel which is formed by the coil 52 and its spaced apart windings. The diesel fuel is preheated to a great extent because the coil 52, on the one hand, is usually in a tight metallically conductive contact with the housing 49 and, on the other hand, provides a great surface area for the heat transfer. When for other applications or for certain periods of time a reduced heat transfer is desired, the tube 53 is turned relative to the housing 49 such that at least a portion of the coil windings 52 are removed from the inner mantle surface of the cylinder bore 51. The removed windings which, in this case, may be contacting the inner tube 53 then hardly transfer heat because the diesel fuel has a bad heat conductivity and the coil is insulated from the housing 49. The diesel fuel preheater 48, with the same outer dimensions, is thus universally adaptable and employable for various diesel fuel engines.

FIG. 5 shows an adjustable and controllable diesel fuel preheater 55 with a continuous inner tube 56 through which the heat-delivering medium, for example, cooling water, flows. Ribs 57 provided thereat serve to produce a better heat transfer. An outer tube-like housing 60 surrounds the inner tube 56 in a concentric manner so that between the two tubes an annular space 61 is formed. The annular space 61 is closed off at the tube ends and is provided with an inlet opening 58 and an outlet opening 65 for the diesel fuel. A prestressed coil 62 is tightly wound about the outer circumference of the tube 56 which has a smooth outer surface. This coil 62 is comprised of a material which has excellent heat conducting characteristics such as a flat aluminum band. One end of the coil 67 is for example connected with a nut 59 to the housing 60 while the other end is free, respectively adjustable or controllable. For this purpose, teeth 63 are provided at the coil 62 which engage a toothed wheel 64 which is rotatably mounted at the housing 60. Instead of the teeth and the toothed wheel, a worm gear may be provided. When the windings of the coil 67 tightly embrace the tube 56, the heat transfer is great and when the windings are only in a loose contact with the tube 56 only a small amount of heat is transferred to the diesel fuel within the annular space 61. Due to the adjustability of the coil 62 the diesel fuel preheater 55 is extremely adaptable and universally applicable.

In another embodiment an automatic continuous control of the diesel fuel temperature is achieved by connecting the coil 62 to a strain gauge element or thermostat 66 which is fastened to the housing 60 in the vicinity of the outlet opening 65. This strain gauge thermostat 66 varies the heat exchange with the coil 62 such that the diesel fuel temperature at the outlet opening 65 is almost constant. The coil 62 provides an inexpensive design of the diesel fuel preheater 55. It enlarges the surface area which is employed for the heat transfer, forms a suitable channel for the diesel fuel and furthermore serves as a temperature control.

In another embodiment, a few of the windings of the coil 62 may be fixedly connected to the tube 56, for example, by welding them to the tube 56, while a plurality of other windings are adjustable. A conductive gauze material which is fastened between the adjustable windings 62 and the tube 56 may be used to improve the heat transfer (not shown in the drawings).

FIG. 6 shows a controllable diesel fuel preheater 68 with a heat exchanger tube 69 that is provided with radial ribs 70 of various diameters. These ribs 70 are arranged over the length of the tube 69 in alternating grooves of greater and smaller diameters. The tube 69 is provided with a sliding sleeve 72 which is used as a heat exchange control together with the piston 71 or a thermostat 66. The sliding sleeve 72 has cutouts 73 which are arranged as pairs over the lengths of the sliding sleeve whereby the pairs are spaced from one another in the axial direction and whereby the distance between the pairs of cutouts corresponds to the distance between the groups of ribs having an identical diameter. The two cutouts of one pair are spaced from one another by an angle of 180°. The tube 69 together with the sliding sleeve 72 is enclosed by a housing 74 which is provided with a diesel fuel inlet opening 76 and, diagonally opposed, an outlet opening 75. As can be seen from FIG. 6 the smaller ribs of the tube 69 are continuously operating as heat exchangers due to the design of the sliding sleeve 72. The greater ribs on the other hand, depending on the position of the sliding sleeve, may be switched on and off as desired so that they contribute to the diesel fuel preheating to a lesser or greater extent. The sliding sleeve 72 which is comprised of a heat insulating or a metallic material is easily adjustable and, despite a small adjusting distance s, it may switch on and off a plurality of ribs 70. When the piston 71 is moved to the left by the amount corresponding to the adjusting path s practically all ribs are in an exposed position for the heat transfer. In the position shown in the drawing a plurality of ribs with a greater diameter are insulated by the sliding sleeve 72, i.e., they are switched off.

The diesel fuel preheater 80 according to FIG. 7 has an inner tube through which the cooling water streams and furthermore has at least at its outer mantle surface area axially extending ribs 81 which form the channels 82 for the diesel fuel to be preheated. At least one end of the channels 82 is provided with a rotary slide valve 83 which at its outer circumference has teeth 84. The teeth 84, when the heat exchanger is operating at full load, are positioned behind the ribs 81. Expediently, the number of teeth at the rotary slide valve 83 is smaller than the number of channels 82 so that when the valve 83 is rotated the diesel fuel flow is shut off only for a portion of the channels 82, respectively, reduced for a portion of the channels 82 while the other channels are continuously open.

As can be seen from FIG. 7 a tooth 84 of the rotary slide valve 83 is positioned behind each second rib 81. Thus, the oversized heat exchanger, for example, during cold start and cold running conditions of the engine, is switched on with all its channels 82 being open and when the engine operation temperature is reached the rotation of the rotary slide valve 83 reduces its power to a partial load. During the partial load stage the diesel fuel flows only through a few channels 82 at a higher speed so that the diesel fuel is heated to a lesser degree. The rotary slide valve 83 may be connected to a piston 71 or to a thermostat 66 which may be of the strain gauge or bimetal type. In this embodiment, a small adjusting path is sufficient for the limitation or control of the diesel fuel temperature. The heat exchanger 80 may expediently be manufactured from standard parts by simply inserting a tube with ribs concentrically into another tube.

Figure 8:
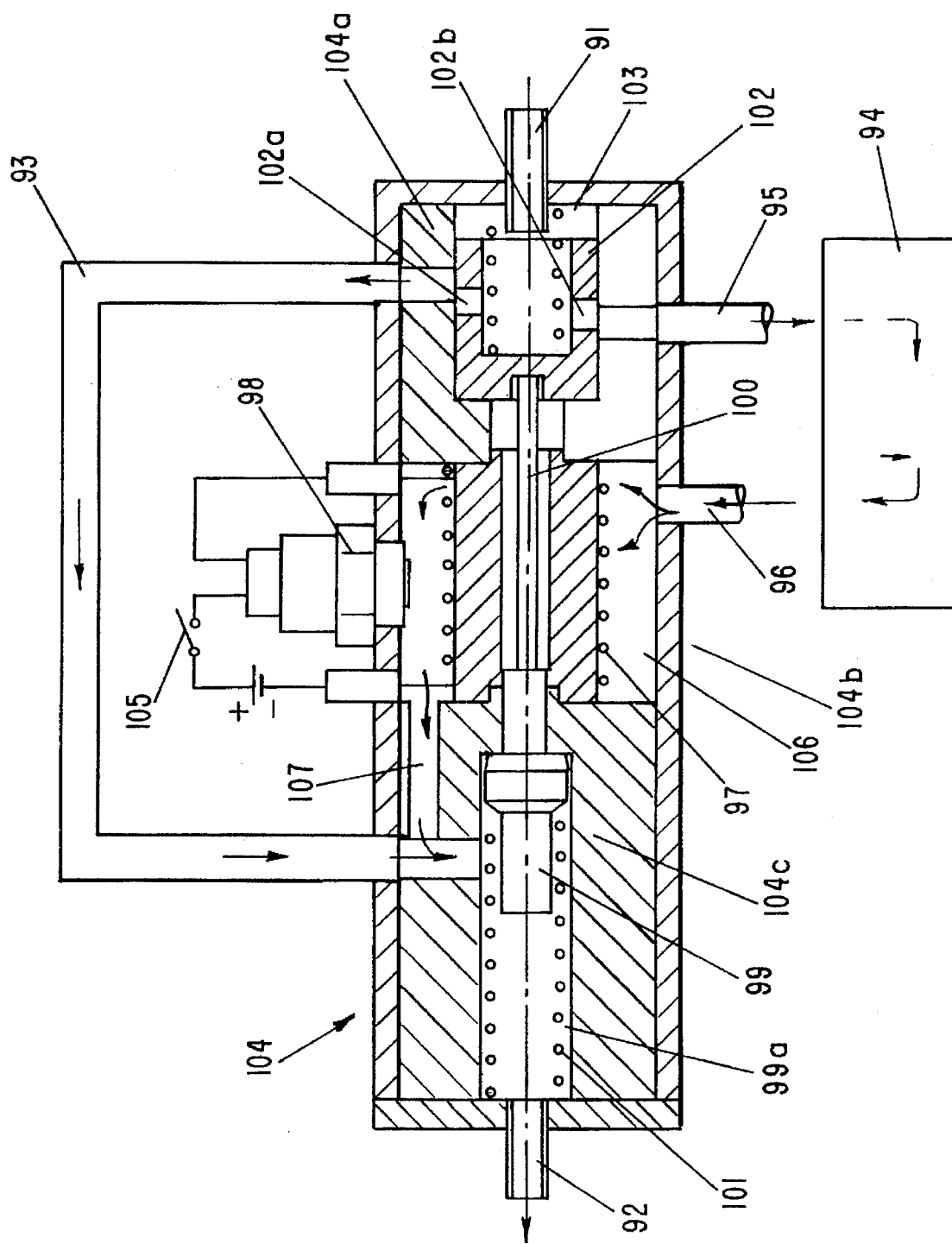
FIG. 8 shows a further embodiment of the present invention with a bypass line.

FIG. 8 shows a diesel fuel preheater with a bypass line 93. This figure represents a schematic drawing of the device in a longitudinal cross-section of the housing.

The diesel fuel preheater has two non-grounded electrical connectors for supplying electrical current to the heating coil 97. Two inlet and outlet sockets 91 and 92 for the diesel fuel are provided whereby the fuel outlet 92 is positioned as close as possible to the entrance into the fuel filter. Via two further non-represented connectors the heat exchanger 94 is provided with cooling water from the engine.

Via the inlet 91 the diesel fuel coming from the fuel tank is introduced into the diesel fuel preheater and exits via the outlet 92. In the interior of the diesel fuel preheater housing 104, preferably a unitary part which is comprised of sections 104a, 104b, and 104c, an expansion element 99 is provided within a chamber 99a. The expansion element 99 is connected with a spring 101 within the chamber 99a of the housing part 104c. When the temperature of the diesel fuel at the location of the expansion element 99 rises, the expansion element 99 displaces (to the right in the drawing) with a push rod 100 the control slide 102 against the return force of a spring 103 (deactivated state). When the temperature of the diesel fuel decreases, the spring 103 forces the 3/2 way valve in the form of a control slide 102, the push rod 100, and the expansion element 99 to the left in the drawing (activated state).

The control slide 102 is a cylindrical member that is open to the inlet 91 at one end, while the opposite end is closed. The cylindrical wall has two oppositely arranged throughbores 102a and 102b. Depending on the position of the control slide 102 (3/2 way valve), the line 95 leading to the heat exchanger 94 (activated state) or to the bypass line 93 (deactivated state) is opened via the throughbores 102a and 102b. Furthermore, the part 104b of the preheater housing 104 encloses a heating chamber 106 with a heating coil 97 for heating the diesel fuel with electric energy. The heating coil 97 is connected in series with the thermostat 98. The electrical heating current may be supplied from the on-board electrical supply of a motorized vehicle.

The diesel fuel flow which enters through the inlet 91 is divided within the control slide 102 (3/2 way valve) into two partial streams. One of the partial streams is guided through the bypass line 93 into the chamber 99a, and the other partial stream is fed through the line 95 to the heat exchanger 94 and from there into the heating chamber 106 via line 96. Line 107 connects the heating chamber 106 to the chamber 99a. The following operational conditions can occur.

A. The diesel fuel within the inlet 91 has already a temperature above the critical paraffin separation temperature. Heating of the diesel fuel is thus not required. The expansion element 99 forces, due to the high diesel fuel temperature, the control slide 102 to the right so that the channel 95 is almost entirely closed and the bypass line 93 is opened. The line 95 is not entirely closed so that diesel fuel still contained therein does not age or become resinous. In this manner, only a minimal amount of cooling water energy is transferred to the diesel fuel via the heat exchanger 94. Furthermore, the switch 105 controlled by the thermostat 98 is in its open position so that no heating current flows. Accordingly, almost the entire diesel fuel flow is guided via the bypass line 93 to the expansion element 99 and from there via the fuel outlet 92 to the fuel filter.

B. The fuel temperature is below the critical temperature at which paraffin crystals will precipitate. The expansion element 99 registers the low temperature, and the slide 102 is forced by the spring 103 to the left in the drawing. Accordingly, the bypass line 93 is closed and the line 95 is opened. The diesel fuel flows into the heat exchanger 94 where it is heated by the cooling water. When the cooling water is still too cold, the cold diesel fuel flows into the chamber 106 to the heating coil 97 and the thermostat 98. The thermostat 98 registers the cold temperature and accordingly actuates the switch 105 so that current is supplied to the heating coil 97. The diesel fuel temperature within the heating chamber 106 of the heating coil 97 soon surpasses the desired diesel fuel temperature at the outlet 92 of the diesel fuel preheater to the fuel filter. The expansion element 99 is thus heated and expands thereby forcing with the push rod 100 the control slide 102 to the right (in the drawing) so that the bypass line 93 is partially opened, while the line 95 is partially closed. Within certain tolerance values a predetermined temperature may thus be maintained.

C. When due to a reduced flow of diesel fuel the diesel fuel within the chamber 106 is heated by the heating coil 97 to a an excessively high temperature, the thermostat 98 opens the switch 105 at a preset temperature limit and thus interrupts the supply of current. Heating no longer takes place so that the temperature decreases. Depending on the temperature the thermostat thus controls, i.e., switches on and off, the heating coil. When in the meantime the cooling water has been heated, the diesel fuel is already preheated within the heat exchanger 94. The diesel fuel thus reaches the heating coil 97 at an elevated temperature. The diesel fuel temperature within the heating chamber 106 of the heating coil 97 thus heats up relatively quickly and reaches faster the preset temperature limit at which the thermostat opens the switch 105 and thus interrupts the current to the heating coil 97. This periodic control operation is repeated in the same manner as described above until the diesel fuel leaving the heat exchanger 94 has reached such a high temperature that the switch 105 is permanently in its open position. When the diesel fuel has been heated within the heat exchanger 94 to an excessively high temperature, the expansion element 99 pushes the control slide 102 with the push rod 100 to the right in the drawing so that a portion or the entire amount of the unheated diesel fuel coming from the fuel tank is guided through the bypass line 93 to the expansion element 99 and is intermixed with the pre-heated diesel fuel coming from the heat exchanger 94. Accordingly, within certain tolerance values, the desired temperature of the diesel fuel can be adjusted.

Heat exchanger 94 and preheater housing 104 can be constructed so as to be directly connected with one another.

Figure 9A:
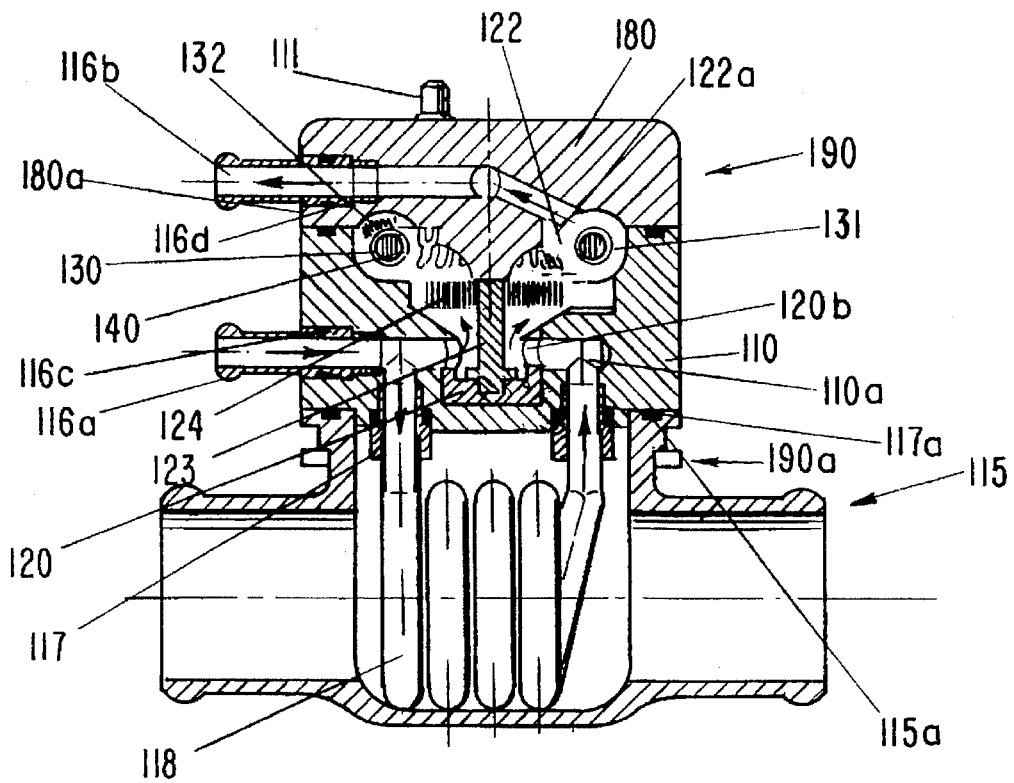
FIGS. 9a–c show a further embodiment of an inventive diesel fuel preheater in a sectional view having a PTC element as the electric heating and control device, FIG. 9a showing the device in section during cold-start operation, FIG. 9b showing the device during normal operation, and FIG. 9c showing an end view of the device.
Figure 9B:
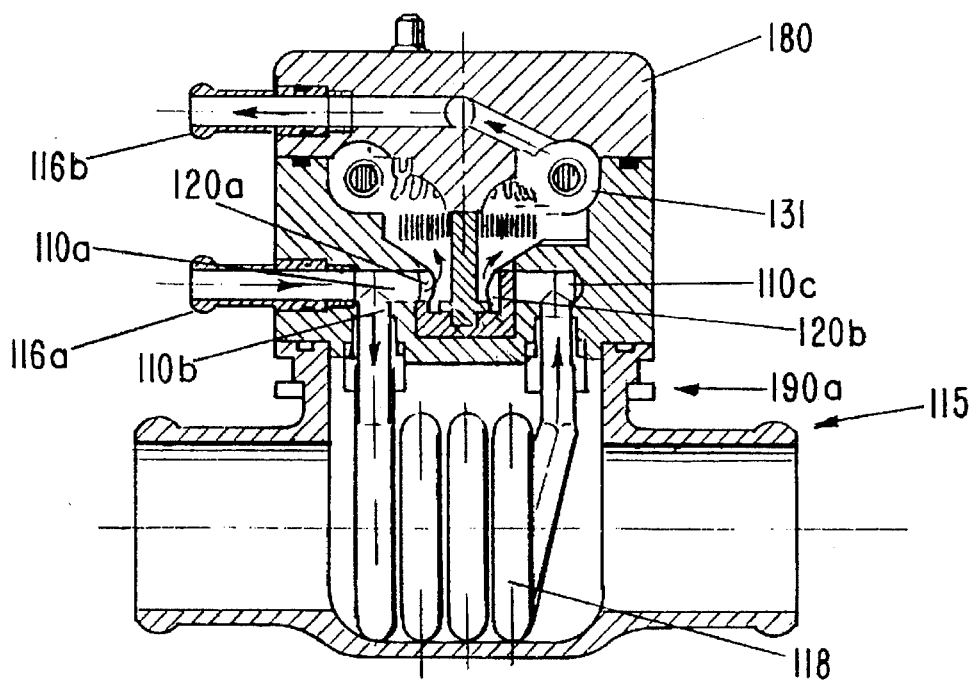
Figure 9C:
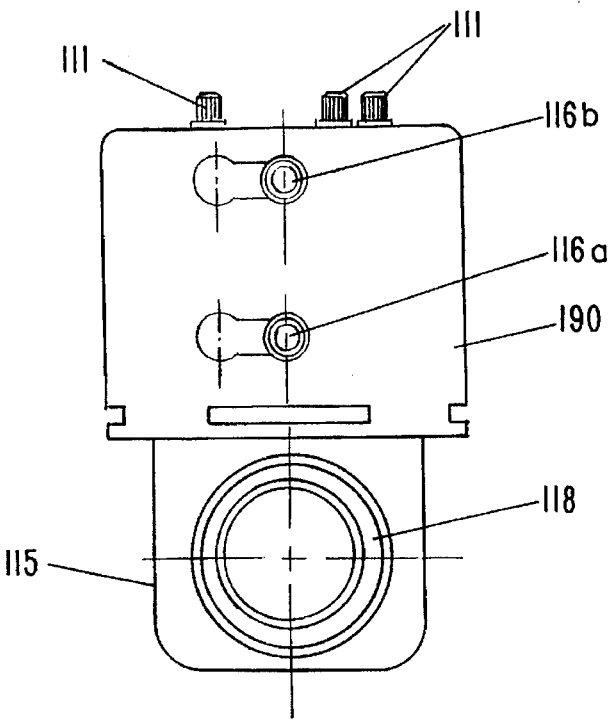
Figure 10A:
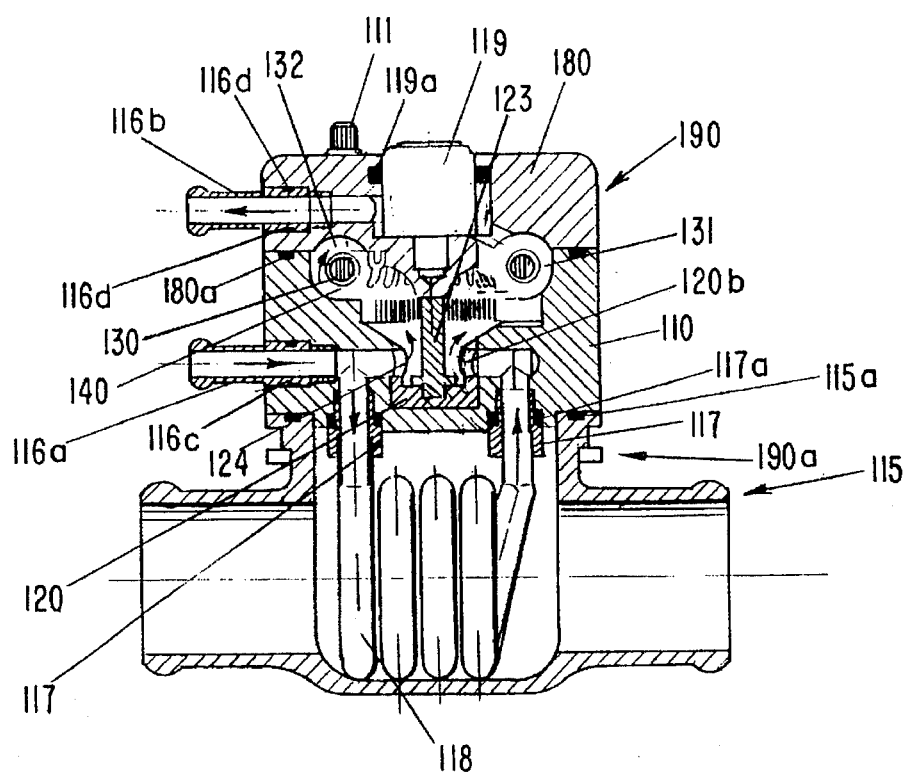
FIGS. 10a–c show another embodiment of the inventive diesel fuel preheater with a temperature switch as the electrical heating and control device, FIG. 10a showing the device in section during cold-start operation, FIG. 10b showing the device during normal operation, and FIG. 10c showing an end view of the device.
Figure 10B:
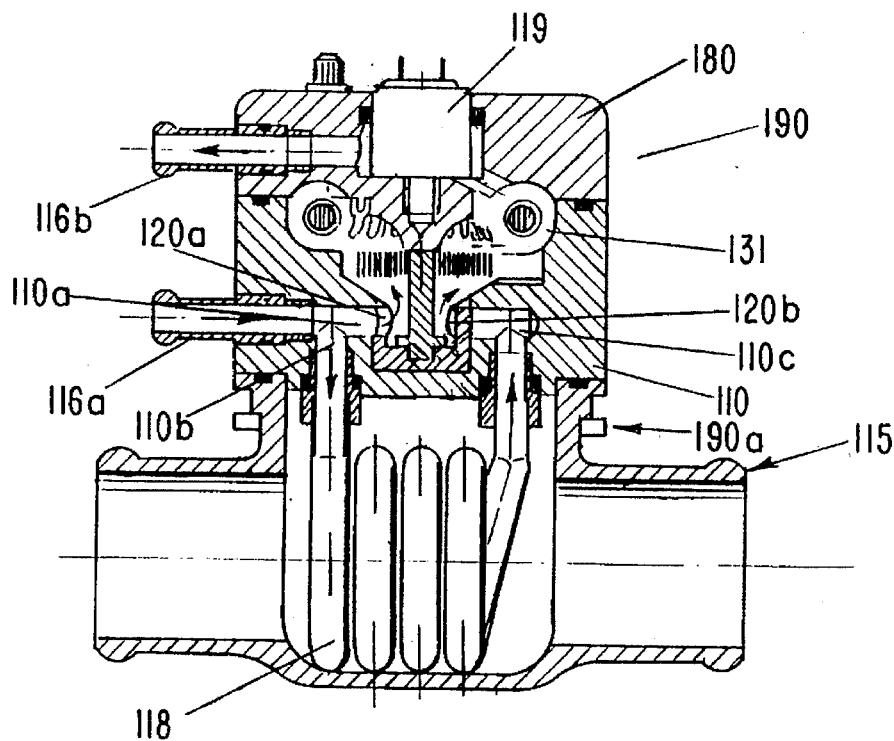
Figure 10C:
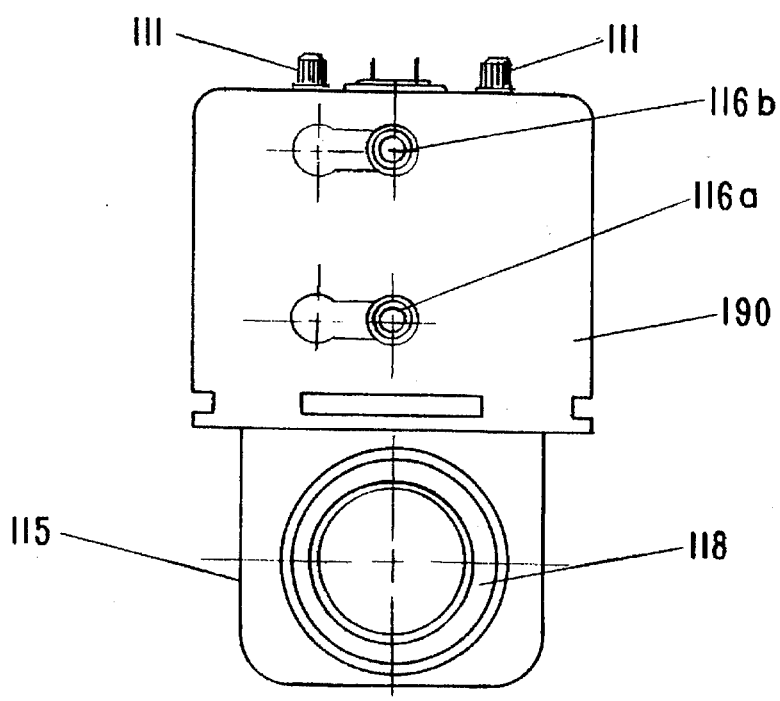
Figure 11A:
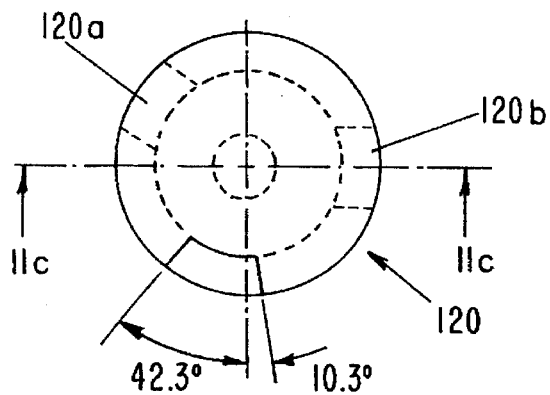
FIGS. 11a–d show 3/2 way valve in the form of a control piston, FIG. 11a showing a bottom view, FIG. 11b showing an end view, FIG. 11c showing an axial section, and FIG. 11d showing a top view.
Figure 11B:
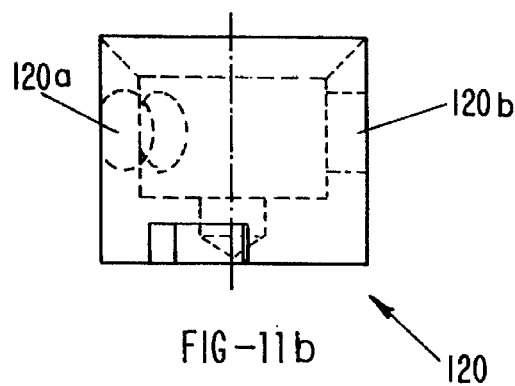
Figure 11C:
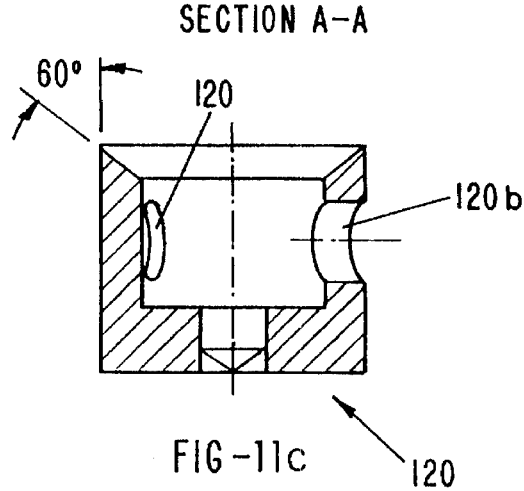
Figure 11D:
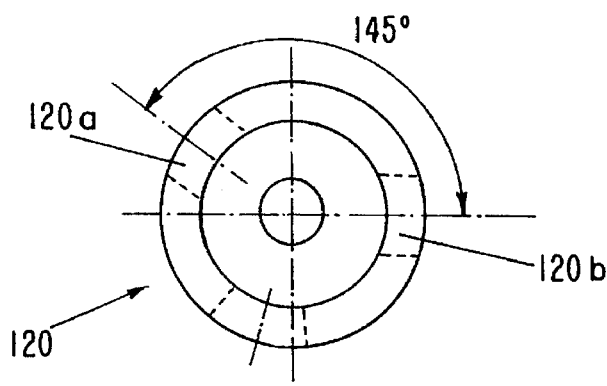
Figure 14A:
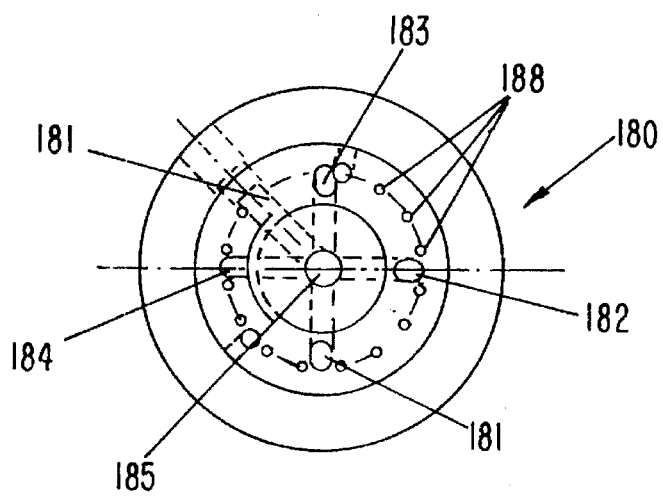
FIGS. 14a–f show the cover for a temperature switch operated device, FIG. 14a representing a bottom view, FIG. 14b showing an end view, FIG. 14c showing a top view, FIG. 14d illustrating an axial section along line A–B in FIG. 14c, FIG. 14e showing a section along line A–C in FIG. 14c, and FIG. 14f showing the encircled detail of FIG. 14d.
Figure 14D:
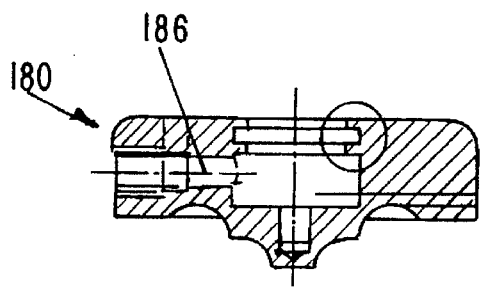
Figure 14B:
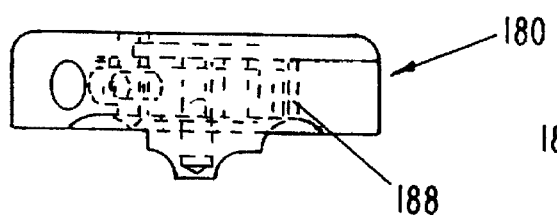
Figure 14E:
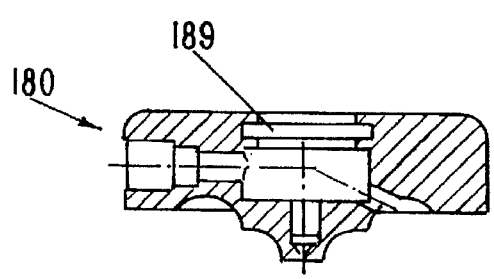
Figure 14C:
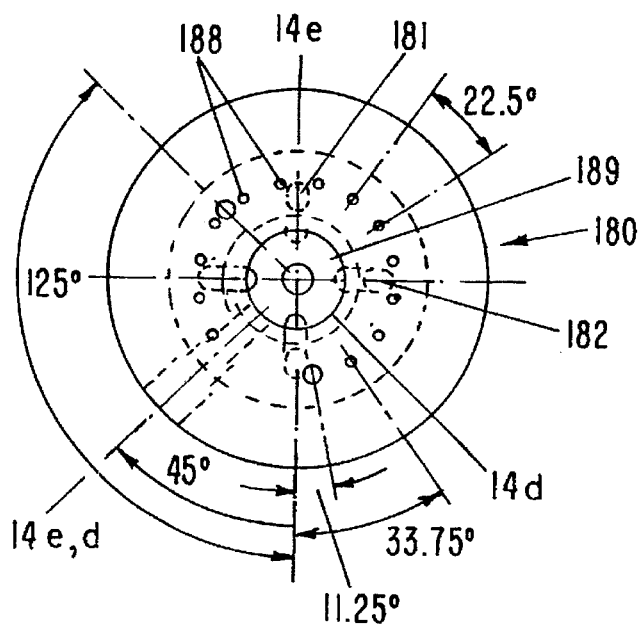
Figure 14F:
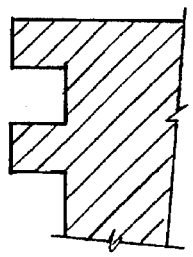
Figure 15A:
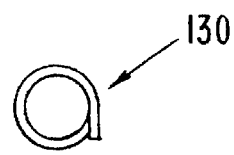
FIGS. 15a–b show the heating coil in an end view and a side view.
Figure 16A:
FIGS. 16a–b show the connectors for the heat exchanger coil in an end view and an axial cross-section.
Figure 15B:
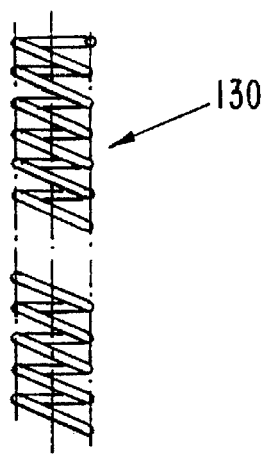
Figure 16B:
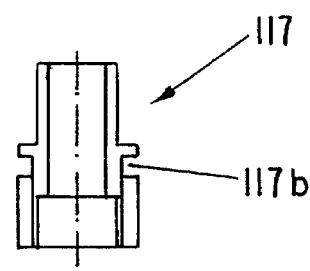
Figure 17A:
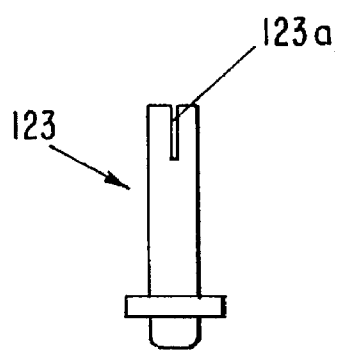
FIGS. 17a–b show the shaft of the control piston in a side view and an end view.
Figure 18A:
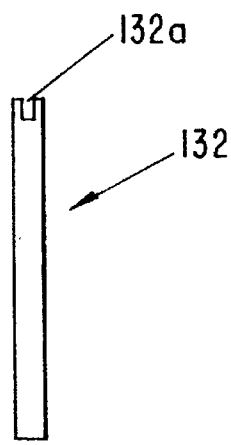
FIGS. 18a–b show the wire connectors for the heating coil in a side view and an end view.
Figure 17B:
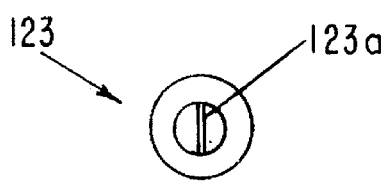
Figure 18B:
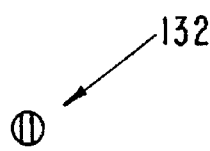

In the following, another preferred embodiment of the present invention will be described in detail with the aid of the drawings FIGS. 9–18. FIGS. 9a–c and 10a–c show a diesel fuel preheater of the same construction, the only difference being the switching means for the heating coil, i.e., the means for detecting the temperature within the heating chamber and turning on and off the heating coil. In FIGS. 9a–c a PTC element is represented, and in FIGS. 10a–c a temperature switch. In the drawings like elements are referenced with like reference numerals.

Referring to FIG. 9a to 9c and FIGS. 10a to 10c, within a support 115 a heat exchanger coil 118 is positioned within the cooling water circuit of a diesel engine and is submerged in the cooling water to serve as a heat exchanger. The diesel fuel preheater is connected within the cooling water circuit of the diesel engine such that the hose ends of the cooling water hoses are slipped over the pipe ends of the support 115 and are fastened with hose clamps.

The heat exchanger coil 118 is soldered to connectors 117 (see FIGS. 16a, 16b) of the housing 110. The connectors 117 are connected within the housing 110 with annular sealing rings 117a received within a recess 117b. The 3/2 way valve is in the form of a control piston 120 (see FIGS. 11a–d) that is rotatably supported within the housing 110. Connected to the inlet socket 116a is the fuel supply line which is connected via a fuel pump to the fuel tank. The upper outlet socket 116b in the cover 180 of the housing 110 is connected with an outlet line that supplies the diesel fuel via a fuel filter to the fuel injection pump. The sockets 116a and 116b are connected within the housing 110 and the cover 180 in a sealing manner with sealing rings 116c, 116d. Cover 180 and housing 110 are sealingly connected to one another with a sealing ring 180a. For receiving the temperature switch 119, the cover 180 has a boring 189 (see FIGS. 14d and 14e). For receiving the PTC element, the heating chamber 131 has a recess 122a within the housing 110 (see FIG. 9a).

The control piston 120 is a substantially cylindrical member with a bottom and cylindrical sidewalls. The control piston 120 (see FIG. 11a–11d) has an axially positioned shaft 123 having a slot 123a (see FIGS. 17a, 17b) for receiving a bimetallic spring 124 which is supported at the housing 110. The bimetallic spring 124 rotates the shaft 123 and thus the control piston 120 as a function of the temperature variations of the diesel fuel. The rotational movement of the control piston 120 is limited by a groove within the bottom of the control piston 120 and a pin which is provided within the housing 110. The bottom of the cylindrical member has an arc-shaped groove for limiting the angle of rotation of the control member which angle is preferably 50° to 55°. In an especially preferred embodiment the angle of rotation is limited to 52.6° (see FIG. 11a). The cylindrical wall has two throughbores 120a, 120b arranged asymmetrical within the cylindrical wall, preferably displaced at an angle of 145° relative to one another (see FIG. 11d).

The housing 110 has two channels or bores 110a, 110c registering with the throughbores 120a, 120b of the cylindrical wall such that a sum of flow cross-sections of said two throughbores in a partially open state of the throughbores corresponds to a cross-section of a completely open throughbore.

Adjacent to the control piston 120 an electric heating coil 130 made of constantan is positioned within the substantially annular heating chamber 131 enclosed by the housing 110 and the cover 180. The annular heating coil 130 is connected with wire connectors 132 (see FIGS. 18a, 18b) to the cover 180 that is provided with borings 188 for receiving the wire connectors 132 in a compression fit (see FIGS. 14a, 14b, 14c; in FIGS. 13a, 13b, 13c the borings 188 are not indicated in order to facilitate understanding of the drawings). The wire connectors 132 have recesses 132a for receiving the heating coil 130.

The heating coil 130 is connected in series to a temperature fuse 140 positioned in the vicinity of the heating coil 130. One end of the heating coil 130 is connected via the temperature fuse 140 and via a contact 111 to the minus or ground wire of the vehicle battery. The other end of the heating coil 130 is connected with the corresponding control device: in FIGS. 9a–c to a PTC element 122 and in FIGS. 10a–c to a temperature switch 119. PTC element 122, temperature switch 119, temperature fuse 140, and heating coil 130 are designed and mounted such that an intimate contact with the diesel fuel is provided, i.e., the components, where possible, are surrounded from all sides by the fuel.

The heating chamber 131, on the one hand, is connected via channel 110a and the throughbore 120a to the inlet socket 116a for the diesel fuel or, on the other hand, is connected via throughbore 120b, channel 110c, heat exchanger coil 118, and channel 110b to the inlet socket 116a (activated state).

As a function of the temperature of the diesel fuel the control piston 120 is rotated within the housing thus opening or closing the passageways for the fuel to the heating chamber and controlling the flow of the diesel fuel within the preheater.

The cover 180 of the housing 110 is preferably provided with substantially radially extending (when viewed in a plan view) slanted borings, preferably four such bores 181, 182, 183, 184, that extend from the annular heating chamber 131 inwardly to a central bore 185 that is connected with a radially extending outlet channel or bore 186 to the outlet socket 116b.

In both embodiments according to FIGS. 9a–c and 10a–c, the components housing 110, cover 180, and support 115 are connected to one another to form a unit by an enclosure 190 made of thin sheet metal. Enclosure 190 is used to center the assembly of housing/cover/support relative to one another by slipping the enclosure over. The bottom portion 190a of the enclosure 190, after positioning and centering, is stamped to provide a permanently fast connection of enclosure, cover, housing, and support.

As represented in the drawings FIGS. 9a–c, between the fuel inlet socket 116a and the fuel outlet socket 116b, all components 120 to 124 and 130–132, 140 are located within the housing 110 of the preheater. The PTC element 122 is especially advantageous due to its simple, automatic temperature controlling effect. Despite the relatively small embodiment, it is suitable for the control of the preheating device. The compact, slim construction of the diesel fuel preheating device provides for space saving arrangement within the engine compartment and the cylindrical form provides for a simple replacement of the important constructive components.

The inventive preheater may be connected to a known electronic information and control system of a vehicle (on-board computer) that commonly processes and displays information concerning fuel consumption, fuel temperature, fuel flow etc. The on-board computer can then be used to control the inventive preheater.

In the following the operation of the preferred embodiment will be described in detail.

COLD START OPERATION

Due to a low diesel fuel temperature the heating coil 130 is switched on, depending on the preferred embodiment by the temperature switch 119 or electronic switching with the aid of the PTC element 122. Due to the instantaneous switching of the heating coil 130 the cold diesel fuel within the housing 110 is immediately heated and flows through the bores 181, 182, 183, 184, 185, 186 within the cover 180 via the outlet socket 116b to the injection pump. At the same time, the cold diesel fuel enters through the inlet socket 116a and the channel 110b of the housing 110 the heat exchanger coil 118 of the heat exchanger since the bimetallic spring 124, due to the temperature of the cold diesel fuel, has rotated the shaft 123 of the control piston 120 to close off the passage through channel 110a and 120a into the heating chamber. Since the cooling water is still cold, the diesel fuel is not heated in the heat exchanger and flows out of the heat exchanger coil 118 into the channel 110c and through the bore 120b into the heating chamber 131 past the bimetallic spring 124 to the heating coil 130. As mentioned above, the heating coil 130 is supplied with electric current and heats the diesel fuel. Via the bores 181–186 within the cover 180 the heated diesel fuel flows past the temperature switch 119 or the PTC element 122 and passes through the outlet socket 116b into the injection pump.

OPERATION WITH A WARMED-UP ENGINE

The cold diesel fuel flows via the inlet socket 116a into the heat exchanger coil 118 of the heat exchanger. Since the cooling water circuit of the engine is slowly being heated, the cold diesel fuel is preheated in the heat exchanger coil 118 of the heat exchanger. With a rising cooling water temperature the temperature of the diesel fuel also increases within the heat exchanger coil 118 so that the diesel fuel leaves the heat exchanger coil 118 at an elevated temperature and flows past the bimetallic spring 124, which due to the increasing temperature slowly rotates the control piston 120 counterclockwise and thus regulates the flow through the passageways 110a, 120a, and 110b, 118, 110c, 120b; i.e., less fuel passes through the heat exchanger. The diesel fuel reaches the heating coil 130 and is further heated. The warmed diesel fuel flows past the PTC element 122 or, depending on the variant of the embodiment, past the temperature switch 119. Upon reaching the predetermined temperature, the current supply to the heating coil 130 is switched off so that further heating of the diesel fuel with the heating coil 130 is stopped.

NORMAL OPERATION

When the cooling water temperature of the engine has reached its maximum temperature the heat exchanger coil 118 of the heat exchanger provides sufficient energy to preheat the diesel fuel. The electric heating coil 130 is therefore switched off. When the heating effect of the diesel fuel within the heat exchanger is too great, the bimetallic spring 124 rotates via the shaft 123 the control piston 120 toward a closed position of the channel 110c, i.e., the throughbore 120b is no longer aligned with the channel 110c and flow through the heat exchanger coil 118 is greatly reduced. Cold fuel accordingly flows through the channel 110a through the throughbore 120a directly into the heating chamber 131 so that a mixed temperature of heated (through the heat exchanger) and cold diesel fuel of approximately 20° C. can be adjusted at the outlet socket 116b. The bimetallic spring 124 rotates the control piston 120 depending on the temperature of the diesel fuel flowing past it and accordingly constantly adjusts the fuel temperature by rotating the control piston and routing the fuel entering through inlet socket 116a through the heat exchanger and/or directly through the heating chamber.

NORMAL OPERATION AT WARM OUTER TEMPERATURES

When via the inlet socket 116a warm diesel fuel is guided into the heating chamber 131, the rotation of the control piston 120 caused by the bimetallic spring 124 closes the passage 110c, 120b so that fuel is no longer guided through the heating coil 118 and is no longer heated by the heat exchanger. The diesel fuel thus flows through the diesel fuel preheater, but is no longer heated. The fuel is simply guided through the heating chamber 131 and the bores 181–186 in the cover to the outlet socket 116b into the injection pump.

OVERLOAD PROTECTION

In the case of a malfunction in which the heating coil 130 is not turned off, an overheating of the diesel fuel is prevented by the temperature fuse 140. Since the temperature fuse 140 is located in the direct vicinity of the heating coil 130, the temperature fuse 140 interrupts the current supply to the heating coil 130 as soon as the temperature of the diesel fuel surpasses approximately 80° C.

The advantage of the aforedescribed diesel preheater on the one hand lies in its favorable function according to which the diesel fuel can be heated quickly and economically and, on the other hand in a very compact space-saving construction which also allows for material and weight reduction as well as an inexpensive manufacture. The electric fuel heating is only used as an auxiliary device that automatically is turned on when the diesel fuel is still at low temperatures, for example, during cold start operation. Accordingly, the fuel heating is achieved primarily through the heat exchanger which uses for this purposes the cooling water temperature. An unnecessary electric heating of the fuel is thus prevented since the increasing engine temperature and cooling water temperature are immediately used for the diesel fuel preheating step, whereby initially the electric heating is supported, but is automatically switched off when the heat exchanger alone can provide the necessary energy for reaching the desired diesel fuel temperature. The quick temperature increase that can be achieved with the inventive diesel preheater improves the ignition characteristics of the diesel fuel which is especially important during cold start and during the initial warm-up of the engine. With an improved combustion and a shortened warm-up period the fuel consumption and pollutant emission is also reduced. An effective, fast-acting diesel preheater can also contribute to the reduction of friction, wear, and engine noise during cold start operation. For an engine operating at normal temperatures the preheated diesel fuel provides a uniform density and thus defined conditions for optimized injection, combustion, and energy conversion.

The diesel fuel preheaters shown above may not only be used for diesel fuel but can be used for any other type of fuel.

The present invention is, of course, in no way restricted to the specific disclosure of the specification and drawings, but also encompasses any modifications within the scope of the appended claims.

What we claim is:

1. A diesel fuel preheater for engines in which the diesel fuel is heated electrically and by a heat exchanger, comprising:

an electric heating chamber positioned downstream of said heat exchanger;

a 3/2 way valve connected to said electric heating chamber and said heat exchanger, said 3/2 way valve, in an activated state thereof, guiding a flow of diesel fuel through said heat exchanger and said heating chamber, and, in a deactivated state thereof, guiding a portion of said flow of diesel fuel through said heat exchanger, said 3/2 way valve comprising an adjustment means for regulating said flow of diesel fuel;

an electric heating means fastened within said heating chamber;

a switching unit connected to said heating means;

wherein said 3/2 way valve has a first throughbore connected to said heat exchanger and a second throughbore connected to a bypass line for bypassing said heat exchanger and said heating chamber, said 3/2 way valve, in said deactivated state thereof, guiding a portion of said flow of diesel fuel through said bypass line.

2. A diesel fuel preheater according to claim 1, further comprising:

a housing having a first housing section, a second housing section, and a third housing section, said first housing section enclosing said 3/2-way valve, said second housing section enclosing said heating chamber, and said third housing section encloses a chamber for receiving said adjusting member; wherein:

said 3/2-way valve includes a control slide axially slidable within said first housing section, said control slide having a fuel inlet connected to said first and said second throughbores;

said adjusting means is an expansion member for displacing said control slide to open and close said first and said second throughbores as a function of a temperature of the fuel at an outlet socket of said diesel fuel heater;

said heating means comprises a heating coil; and said switching unit comprises a thermostat and supplies current to said heating coil as a function of a temperature of the fuel within said heating chamber.

3. A diesel fuel preheater according to claim 2, further comprising a push rod connected between said expansion element and said control slide.

4. A diesel fuel preheater according to claim 2, further comprising a connecting line between said heating chamber and said chamber for receiving said adjusting member.

5. A diesel fuel preheater according to claim 2, further comprising a first pressure spring positioned within said chamber for receiving said adjusting member for connecting said expansion element within said third housing section.

6. A diesel fuel preheater according to claim 2, further comprising a second pressure spring positioned within said first housing section and connected to said control slide of said 3/2-way valve for biasing said 3/2-way valve into said activated state.

7. A diesel fuel preheater for engines in which the diesel fuel is heated electrically and by a heat exchanger, comprising:

an electric heating chamber positioned downstream of said heat exchanger;

a 3/2 way valve connected to said electric heating chamber and said heat exchanger, said 3/2 way valve, in an activated state thereof, guiding a flow of diesel fuel through said heat exchanger and said heating chamber, and, in a deactivated state thereof, guiding a portion of said flow of diesel fuel through said heat exchanger, said 3/2 way valve comprising an adjustment means for regulating said flow of diesel fuel;

an electric heating means fastened within said heating chamber;

a switching unit connected to said heating means;

wherein in an end position of said deactivated state said 3/2-way valve shuts off flow of said portion of diesel fuel through said heat exchanger such that diesel fuel flows exclusively through said heating chamber.

8. A diesel fuel preheater according to claim 6, wherein said 3/2-way valve is a rotatable control piston and said adjustment means is a bimetallic spring connected to said control piston, said bimetallic spring rotating said control piston as a function of a temperature of the diesel fuel.

9. A diesel fuel preheater according to claim 7, wherein said control piston comprises a cylindrical wall and a bottom with an arc-shaped groove for limiting an angle of rotation of said control member.

10. A diesel fuel preheater according to claim 8, wherein said cylindrical wall has two throughbores arranged asymmetrically within said cylindrical wall and wherein said diesel fuel preheater has a housing for receiving said control piston and enclosing said heating chamber, said housing having two bores cooperating with said throughbores of said cylindrical wall such that a sum of flow cross-sections of said two throughbores in a partially open state corresponds to a cross-section of a completely open throughbore.

11. A diesel fuel preheater according to claim 7, further comprising a shaft connecting said bimetallic spring with said control piston, wherein a position of said control piston relative to said bimetallic spring is adjustable by rotating said shaft.

12. A diesel fuel preheater according to claim 9, further comprising a cover and a support for said housing and an enclosure made of sheet metal for centering said housing, said cover, and said support relative to one another by slipping said enclosure over said cover, said housing, and said support, with a bottom portion of said enclosure, after positioning and centering, being stamped for a permanent fast connection of said enclosure, said cover, said housing, and said support.

13. A diesel fuel preheater according to claim 7, wherein said heating means is a heating coil wound from a wire that has a temperature-independent resistance.

14. A diesel fuel preheater according to claim 11, wherein said heat exchanger comprises a heat exchanger coil made of copper pipe, said heat exchanger coil connected to said housing and positioned on said support.

15. A diesel fuel preheater according to claim 7, wherein said switching unit is a temperature switch with a two stage control.

16. A diesel fuel preheater according to claim 12, further comprising an overload protector in the form of a temperature fuse connected in series with said heating coil, said temperature fuse connected with said cover directly adjacent and parallel to said heating coil.

17. A diesel fuel preheater according to claim 7, wherein said cover has four slanted bores extending substantially radially, when viewed in a plan view, and a central axial bore, said radially extending bores connecting said heating chamber to said axial bore, said cover further comprising an outlet channel connected to said central axial bore.

* * * * *